US010160908B2

(12) United States Patent
Lecointe

(10) Patent No.: US 10,160,908 B2
(45) Date of Patent: Dec. 25, 2018

(54) METHOD OF SOIL CONDITIONING BY APPLICATION OF WATER-SOLUBLE OR WATER-SWELLING POLYMER

(71) Applicant: S.P.C.M. SA, Andrezieux Boutheon (FR)

(72) Inventor: Charles Lecointe, Vernaison (FR)

(73) Assignee: S.P.C.M. SA (FR)

( * ) Notice: Subject to any disclaimer, the term of this patent is extended or adjusted under 35 U.S.C. 154(b) by 64 days.

(21) Appl. No.: 14/908,969

(22) PCT Filed: Jul. 21, 2014

(86) PCT No.: PCT/FR2014/051863
§ 371 (c)(1),
(2) Date: Jan. 29, 2016

(87) PCT Pub. No.: WO2015/015087
PCT Pub. Date: Feb. 5, 2015

(65) Prior Publication Data
US 2016/0177179 A1    Jun. 23, 2016

(30) Foreign Application Priority Data

Aug. 2, 2013    (FR) .................................... 13 57705

(51) Int. Cl.
*C09K 17/22*    (2006.01)
*A01C 17/00*    (2006.01)
*A01C 21/00*    (2006.01)

(52) U.S. Cl.
CPC ............ *C09K 17/22* (2013.01); *A01C 17/001* (2013.01); *A01C 21/00* (2013.01)

(58) Field of Classification Search
CPC ........ C09K 17/22; A01C 21/00; A01C 17/001
See application file for complete search history.

(56) References Cited

U.S. PATENT DOCUMENTS

| | | |
|---|---|---|
| 2,888,206 A | 5/1959 | Waldrum |
| 3,395,896 A | 8/1968 | Funk et al. |
| 3,493,500 A | 2/1970 | Volk et al. |

(Continued)

FOREIGN PATENT DOCUMENTS

| | | |
|---|---|---|
| FR | 2370430 A1 | 6/1978 |
| FR | 2798818 A1 | 3/2001 |

(Continued)

OTHER PUBLICATIONS

Bolander, Peter, ed. 1999. Dust palliative selection and application guide. Project Report. 9977-1207-SDTDC. San Dimas, CA: U.S. Department of Agriculture, Forest Service, San Dimas Technology and Development Center, 20 p.*

(Continued)

*Primary Examiner* — Jennifer A Smith
(74) *Attorney, Agent, or Firm* — Forge IP, PLLC

(57) ABSTRACT

Method of soil conditioning which consists in applying a water-soluble or water-swelling polymer to the soil, characterized in that: the polymer is prepared as a polymer-concentrated liquid, the preparation of obtained in this way is applied to the surface of a support rotating about its axis of revolution in order to form droplets which are spread on the soil.

14 Claims, 2 Drawing Sheets

(56) References Cited

U.S. PATENT DOCUMENTS

| | | | |
|---|---|---|---|
| 3,642,072 A * | 2/1972 | Livingston | A62C 5/002 169/14 |
| 3,658,772 A | 4/1972 | Volk et al. | |
| 4,208,973 A | 6/1980 | Baer et al. | |
| 4,475,692 A * | 10/1984 | Walley | A01D 90/105 239/662 |
| 4,539,368 A | 9/1985 | Duncan et al. | |
| 5,605,970 A | 2/1997 | Selvarajan | |
| 5,824,725 A | 10/1998 | Lahalih | |
| 5,837,776 A | 11/1998 | Selvarajan et al. | |
| 7,503,143 B2 | 3/2009 | Krysiak et al. | |
| 8,132,982 B2 * | 3/2012 | Vitale | C09K 3/22 252/88.1 |
| 2006/0193700 A1 | 8/2006 | Putnam et al. | |
| 2010/0072295 A1 | 3/2010 | Usmar et al. | |
| 2011/0274490 A1 * | 11/2011 | Vitale | C04B 26/06 404/82 |
| 2011/0309170 A1 * | 12/2011 | Weeks | A01C 17/001 239/661 |

FOREIGN PATENT DOCUMENTS

| | | |
|---|---|---|
| JP | S6220502 A | 1/1987 |
| WO | 9929745 A1 | 6/1999 |
| WO | 2011002521 A1 | 1/2011 |

OTHER PUBLICATIONS

Yu, et al., "Infiltration and erosion in soils treated with dry PAM and gypsum"—Soil Science Society of America Journal, 67(2), 630-636 (2003), 1 page abstract submitted.

Lentz, et al., (1992), "Preventing irrigation furrow erosion with small applications of polymers", Soil Science Society of America Journal, 56, 1926-1932, 1 page abstract submitted.

* cited by examiner

METHOD OF SOIL CONDITIONING BY APPLICATION OF WATER-SOLUBLE OR WATER-SWELLING POLYMER

FIELD OF THE INVENTION

This invention concerns the domain of soil conditioning by spraying, dispersing or spreading of polymer over its surface, in particular when there is no irrigation system.

Soil conditioning is a way of conserving the integrity of the soil and of improving or conserving its properties, and conserving the environment and people, by limiting the transfer of elements by water or air. These benefits are obtained by protecting the structural stability of the aggregates, limiting erosion and slaking phenomena, leading to many secondary benefits.

"Soil conditioning" refers to the control of water erosion, wind erosion, the forming of slaking crusts, the conservation of the soil aggregate structure, the control of infiltration and diffusion of water, the modification of the hydrophobic or hydrophilic characteristics of the soil, the restoring of sodic or saline soils, the control of water turbidity in flooded crops, the control of contaminant transfer, the limiting of the soil tare levels for some crops, but without being limited to these uses.

The technical domain to which soil conditioning applies is essentially farming but also concerns forestry, construction and public works, mining, storage and transportation of water, conservation of the environment and other domains.

BACKGROUND OF THE INVENTION

Already during World War II, polymers, generally hydrosoluble, were used to stabilize the soil. As early as the 50s, the scientific literature describes the use of various soil conditioning polymers including Krilium® by the Monsanto Chemical Company.

Many other polymers were then described for soil conditioning:

Synthetic polymers: for instance polymers and copolymers based on acrylamide, acrylic acid, acrylates, methacrylic acid, acrylonitrile, vinylpyrrolidone, vinylformamide, itaconic acid, vinyl acetate, maleic acid, ethylene glycol and derivatives of these polymers, for instance hydrolyzed polyacrylonitrile, alcohol polyvinyl, etc.

Natural polymers, natural rubbers, polysaccharides and their derivatives: galactomannan, guar gum, carob gum, xanthane gum, arabic gum, chitosan, carrageenan, pectines, starch, modified starch, alginates, celluloses, cellulose derivatives (cellulose ethers), agar-agar, etc.

Grafted polymers: for instance, acrylamide starch and acrylate copolymers, starch and acrylonitrile copolymers, chitosan and acrylic acid copolymers, etc. Among these polymers, high molecular weight polyacrylamides came under specific investigation and were adopted for soil conditioning, because of their efficiency and lower cost. In 1999, polyacrylamides were being used on more than 400,000 hectares in the United States, essentially by gravity irrigation.

Acrylamide-based polymers incorporated into water are a way of drastically limiting erosion. Lentz et al applied doses of between 1 and 20 ppm of polyacrylamide to irrigation water (furrow irrigation) obtaining up to 97% decrease in erosion for a dose of 10 ppm. There is a great deal of literature on the subject and reference can also be made to the Lentz article, R. D., Shainberg, I., Sojka, R. E., & Carter, D. L. (1992): "Preventing irrigation furrow erosion with small applications of polymers" in the Soil Science Society of America Journal, 56, 1926-1932.

Not only do polyacrylamides limit hydraulic erosion but also the erosion caused by wind. That is why they are also used for controlling dust.

By avoiding the redistribution of fine soil particles under the effect of irrigation water or rain, polyacrylamides prevent slaking crusts from forming, causing the blocking of the soil pores and forming a waterproof and airproof crust. Small plants find it difficult to work their way through the crust, limiting crop emergence. Seed emergence can also be improved by the application of polyacrylamide.

The capability of polyacrylamides to limit water percolation in some soils and at some doses is used to limit losses in water conveyance canals. Soil erosion and in-depth water percolation cause the transfer of various pollutants. Applying polyacrylamide limits the transfer of nutrient elements, phytosanitary and pathogenic products.

The flocculation capability of polyacrylamides also reduces water turbidity in flooded crops.

Polyacrylamides also offer a wide range of benefits linked with soil conditioning in many different domains. But they can only be applied to the soil during irrigation periods, often considered to be an issue.

The application of hydro-soluble polymers such as polyacrylamides essentially takes place through irrigation systems: gravity irrigation, mechanical irrigation, drip irrigation. Polymers, usually in powder form, are thus dissolved and diluted at a rate of between a few ppm and several tens of ppm in irrigation water.

The transport vector is water but it has to be used in large quantities, confining the application of polymers to irrigation periods alone. Hydraulic sowing methods are sometimes used for applying polyacrylamide to the soil. The polyacrylamide is diluted in a large quantity of water applied to the soil. Accordingly, it concerns irrigation which, by definition, is limited to farmland, and is sometimes undesirable.

In the patent FR 2,798,818, the applicant proposes to use polyacrylamides to limit the soil tare level of tuber plants. However, there is no simple method of applying polymers other than to use an irrigation system. Therefore, if the user does not have an irrigation system or does not want to use it to limit the water content in the soil before pulling up, the application of polyacrylamide becomes an issue.

In other words, the conditioning of the soil must be carried out independently of the irrigation.

The document FR-A-2370430 describes a soil conditioning process which consists in applying to the soil a polymer solution (between 0.05 and 1% solid) therefore requiring a large amount of water.

But much of the soil to be conditioned is not farmland and it is unthinkable to waste enormous quantities of water to apply a conditioning polymer to the soil.

Alternatively, the idea of spreading the powder directly on the soil to be treated has been considered. The low density (approximately 0.8) of polyacrylamides or other polymers in powder form, makes the product sensitive to the wind. Applying a limited amount of powder per unit of surface area (less than 250 kg/hectare for instance) generates an application that is not uniform. In addition, the polymer is not in close contact with the soil particles and has to be "activated" by the rain or by irrigation water before becoming effective. Once it has been dissolved by rainwater or irrigation water, the polymer may still not be spread satisfactorily, because of its low mobility through the soil.

Other methods require the use of other vectors.

In the publication by Yu et al "Infiltration and erosion in soils treated with dry PAM and gypsum"—Soil Science Society of America Journal, 67(2), 630-636 (2003), the authors propose to resolve the problem of the quantity of water by using a filler: gypsum. More specifically, they mix polyacrylamide in powder form with quarry gypsum. The mixture is spread on the ground and the combination improves the performance of the gypsum. However, it decreases the performance of the polyacrylamide to reduce erosion and also involves the implementation of an amendment, preventing the application of this method in situations where this amendment is considered undesirable.

In the U.S. Pat. No. 7,503,143 by ENCAP LLC, it is proposed to fix the polyacrylamide to a solid vector, for instance a paper-based mulch. The product is then spread on the soil. However, this method leads to increased manufacturing, storage and transportation costs. The soil coverage continues to be mediocre once the product has been spread, found in the form of large granules spread out randomly on the surface. Accordingly, once the commercial product has been spread, the polyacrylamide is not directly in contact with the soil but is still fixed to its vector. This solution is not satisfactory.

US document US2011/0309170 describes a device for spraying either solids (FIG. 1-3), or liquids (FIG. 4). US document U.S. Pat. No. 2,888,206 describes a rotary support for liquid spraying, more particularly herbicidal compositions.

None of the solutions of the prior embodiment proposes a satisfactory method for applying to the soil such soil conditioning polymers as, for instance, polymers based on acrylamide.

Accordingly, the current solution continues to resort to irrigation. More specifically, irrigation water today is still the essential vector for applying soil conditioning polymers.

This means that there is a need for a new method of conditioning soils with hydro-soluble polymers, without having to resort to an irrigation system.

SUMMARY OF THE INVENTION

This invention proposes to overcome the problems mentioned above.

This invention proposes a new method of soil conditioning which consists in implementing specific equipment for application of hydro-soluble or water-swellable high concentration polymers without being exposed to the demands of the rheology of the polymer at the time of spraying.

More specifically, the purpose of the invention is a soil conditioning method consisting in applying a water-soluble or water-swellable polymer to the soil.

The method is characterized in that:
the polymer is prepared as a polymer-concentrated liquid,
the preparation obtained in this way is applied to the
    surface of a support rotating about its axis of revolution
    in order to form droplets which are spread on the soil.

In practice, the size of the droplets formed in this way is between 0.1 and 1000 μm depending on various parameters, for instance, the rheology of the liquid, the rotation speed of the support, the geometry of the support or the relief of the support.

According to the invention, the polymer-concentrated liquid includes at least water and/or oil and/or a solvent and a soil conditioning polymer whose concentration represents between 5 and 75% of the preparation weight (5000 to 75000 ppm). It can be an aqueous dispersion, an emulsion, generally an inverse emulsion, or a suspension.

Generally, a polymer-concentrated liquid flows vertically over the disc surface.

This method allows the uniform application of the water-soluble polymer to the soil in the form of micro-droplets, without requiring a large amount of water as a vector, and therefore without a conventional irrigation system.

"Irrigation system" refers to a method whereby the water is supplied artificially to a plant, soil or crop substrate to contribute to covering the water needs of the plant or to modify the physical-chemical properties of the soil or the substrate. The water is supplied at a rate of at least 5000 liters of water per hectare and per treatment.

"Treatment" refers, for instance, to the complete rotation of a pivot which takes several hours, or even between 2 and 3 days and provides the soil with a quantity of water included between 100,000 liters and 500,000 liters per hectare. In the case of a sprinkler on a reel, treatment consists in winding of the system which takes several hours and during which approximately the same amount of water per hectare is applied.

We might mention, for instance, irrigation by flooding, thorough irrigation, mobile spray irrigation (reel, pivot, ramp etc.) irrigation by fixed watering, drip irrigation, irrigation by porous pipes, but without being confined to these methods alone. Possibly, irrigation water can be used as vectors for other products such as, for instance, fertilizers, phytosanitary products, soil conditioners.

It is the specific combination of a concentrated form of polymer and specific application equipment that resolves the technical issue of the invention.

The quantity of water-soluble or water-swellable polymer applied to the soil to obtain the soil conditioning effect is comprised between 0.1 and 500 kg of polymer per hectare. In a preferable manner, this quantity is comprised between 1 and 100 kg of polymer per hectare and more preferably between 1 and 50 kg per hectare.

In the method according to the invention, the quantity of water applied to the soil is less than 5000 liters per hectare, preferably less than 2000 liters/hectare and even more preferably less than 1000 liters/hectare.

According to the invention, the concentrated polymer liquid is applied by means of a rotating support in order to form droplets spread over the soil.

The spreading device thus includes the said rotating support.

In practice, the support consists of a disc or a cone, preferably motorized. It is advantageous for the support to have striations or grooves on its surface, preferably connecting the center of the support to its perimeter.

The disc or cone may also have raised edges. The angle of the cone is variable but generally comprised between 1 and 45°.

In an advantageous embodiment, the polymer concentrated liquid is applied to the central part of the support, that is, near its axis of rotation, in particular of the disc or the cone, for better spraying. More specifically, the support has a rotating axis on the perimeter of which the liquid is deposited. The liquid is divided into a multitude of droplets which will be sprayed by means of centrifugal force.

The support can be a cone, preferably striated, at the base of which there is a flat zone receiving the liquid to be sprayed, and at the center of which is the axis around which the disc revolves. The angle of the cone is variable but generally comprised between 1 and 45°.

The support is generally made of plastic. It can also be made of stainless steel or other materials.

Generally, the support is arranged horizontally but can also be inclined, up to vertical, with in this case, a cover at the top and possibly a recycling system for recovering the liquid.

The speed of rotation of the rotating support is generally greater than 100 revolutions per minute, preferably greater than 500 revolutions per minute, allowing smaller droplets to be formed and offering better spraying.

As a support which can be used in the method of the invention, particular mention might be made of rotary or centrifugal Ultra Low Volume (ULV) sprayers or atomizers.

The Micron Sprayer, Mantis ULV-Sprühgeräte GmbH and Berthoud companies . . . sell this type of equipment. The equipment is readily available, cheap to buy and easy to use.

In one particular embodiment, the method also includes:

The storage of the concentrated polymer liquid in a tank;

The transport of the concentrated polymer liquid from the tank to the support by a feeding system.

Generally, the tank is of solid or flexible plastic, for instance, a bag in box arrangement. The recipient or container generally has a volume included between 1 liter and 100 liters but the volume is not limited. For practical reasons, the plastic container will preferentially be of a disposable and therefore recyclable type, facilitating its use and cleaning.

To facilitate the passage of the product, the tank may have an air inlet to prevent it from being brought under negative pressure gradually as the product flows out. If the tank is a flexible pouch (bag in box), the inside and outside pressures will be equalized.

In one particular embodiment of the invention, the air inlets of all the tanks will be connected to a booster or to a compressed air storage system with a pressure relief valve. In this way, the product in each of the tanks is brought under constant positive pressure facilitating the obtaining of the desired flow rate through the means of bringing the liquid to the rotary sprayer.

The means of bringing the concentrated polymer liquid to the support is generally a flexible pipe or a proportioning pipe, also called a nozzle, whose diameter or shape are modified according to the behavior of the product to be spread and the desired flow rate.

The means of bringing in the concentrated polymer liquid can advantageously include a dosing pump such as, for instance, a peristaltic pump.

The dosing of the product and the cleaning of the equipment is facilitated by using a suitable and optimized means of supply.

The spreading device generally includes a tank, a feeding means and a rotating support. In a more specific embodiment, the device includes one or several rotating support(s), with each support having its own tank, connected directly to it by a nozzle. Thus each tank has at least one orifice for venting and preferably a pressurization system favoring the flow of the polymer concentrated liquid through the nozzle.

In another more specific embodiment, a tank is connected to a rotating support by a flexible pipe and a peristaltic dosing pump.

In another more specific embodiment, several tanks are connected to the same tank by flexible pipes. A peristaltic dosing pump can be placed between the tank and the pipe branching out into as many pipes as necessary to each feed a rotating support. A peristaltic dosing pump can be placed on each pipe feeding each support, more specifically between each branch point and each support, at the rate of one pump per support.

Ideally, the product to be spread is supplied in a ready to use disposable container.

Ideally, the nozzles and the flexible pipes supplying the product are disposable.

The method may also include the filtration of the polymer concentrated liquid.

This filtration step avoids the blocking of the finer pipes of the equipment, for instance, the dosing pipe. Filtration is either between the polymer concentrated liquid preparation step and the storage step, or between the storage step and the application step.

The tank(s), the supply means, can be mounted on a ramp carried or towed by a motor-powered machine, such as a tractor, capable of covering large areas in a reasonable time.

The spreading device can also be transportable by man for the conditioning of smaller surface areas for instance. In this case, the container will have a suitable capacity, for instance 10 liters maximum. The support will be mounted on a sleeve allowing precise application to the soil.

It is essential to clean the spreading device for the industrialization of the method. To facilitate the cleaning of the spraying components at the end of treatment, when the tank containing the product to be sprayed is empty, a concentrated solution of ammonium sulfate or other salts compatible with the spraying equipment and the medium in which it will be applied (plots of farmland, natural environment etc.) can be incorporated. This solution is then sprayed to relieve the equipment of any remaining water emulsion in the polyacrylamide water or the particulate suspension. In the case of an inverse emulsion, it is possible to use an oil, preferably vegetable. This will facilitate the cleaning of the equipment in water.

The drifting of the droplet fog can be limited using protection skirts. For a crop which is already in place, it is advantageous to have rotating desks between the crop rows, close to the soil and provided with protection skirts so that the polymer is applied directly to the soil and not to the canopy.

The spreading device can be associated with a soil working tool with teeth, hooks, discs or another arrangement, driven or not, allowing the spraying of the polymers onto the worked soil volume.

The spreading device can be implemented before or at the same time as the burying of drip irrigation pipes, or can be associated with the device used for burying these pipes.

When the polymer has been applied, it is possible to work the soil, for instance to incorporate the fraction of the surface-treated soil into the depth of the arable land.

The spreading device can be associated with a seeding drill to minimize the risks of a slaking crust appearing after sowing.

The spreading device can be adapted by the man of the art according to the type of soil conditioning. For instance, he can vary the diameter of the support, its relief, the diameter of the dosing pipe, the type of pump.

The polymer concentrated liquid contains at least one soil conditioning polymer and at least water and/or oil and/or a solvent.

The polymer concentrated liquid generally includes at least water and/or oil and/or a solvent and a soil conditioning polymer whose concentration is comprised between 5 and 75% by weight. It can be an aqueous dispersion, an emulsion, generally an inverse emulsion, or a suspension of polymer particles.

The polymers used in this invention are water-soluble or water-swellable polymers.

"Water-soluble polymer" refers to a polymer which, when put into solution by means of agitation in water at a temperature of 25° C. at a concentration of 50 g/l produces a solution free of insoluble particles.

"Water-swellable polymer" refers to a polymer which, when put into solution in water at a temperature of 25° C., swells and thickens the solution.

In a preferred embodiment of the invention, the polymers used are water-soluble polymers.

Aqueous polymer dispersions are in a liquid form obtained in a known way by polymerization in an aqueous solution of a mixture of monomers with a salt and/or a polymer known as a stabilizer. They are also referred to as a water in water dispersions.

The polymerization technique leading to aqueous dispersions of hydrophilic polymers has been developed for many years. A first type of anionic dispersion was described by Dow Chemical in U.S. Pat. Nos. 3,658,772 and 3,493,500. The dispersions are obtained by the co-polymerization of acrylic acid and another monomer in an aqueous solution containing inorganic salts.

There are other patents describing in detail this technology of obtaining polymer dispersions. We might mention:
- The Hymo patent JP 62-20502. This is one of the first patents that led to industrial development. In this process, an aqueous dispersion is obtained by the polymerization of a mixture of hydro-soluble monomers in an aqueous saline solution in the presence of a dispersing agent,
- U.S. Pat. No. 5,605,970 which takes up the Hymo method while incorporating the dispersion of a hydrophobic monomer,
- U.S. Pat. No. 5,837,776 which synthesizes the earnings of Dow and Hymo,
- as well as the patent WO 99/29745 which comes very close to the Hymo patent.

This technique consists in polymerizing a monomer or a mixture of monomers in water containing salt and/or other chemical agents like dispersing agents in solution or dispersant. The hydrophilic polymer formed during polymerization is not soluble in the saline medium and/or a medium containing the dispersing agents and precipitates when it reaches a sufficiently high molecular weight. At the end of polymerization, a liquid dispersion of polymer particles in suspension in the aqueous medium is obtained.

Generally, the polymer dispersants contain between 5 and 50% by weight of conditioning polymer, preferably more than 15% and very preferably between 17% and 35% by weight.

Inverse emulsions are also a well known liquid form of the polymers and are obtained by the inverse emulsion polymerization technique. This technique includes the following steps:
a) Take an aqueous solution of the selected monomer or monomers, known as the "aqueous phase",
b) Emulsify this aqueous solution in a phase which is not miscible with water, known as the "oil phase",
c) Ensure the polymerization reaction using polymerization initiators.

Mention can be made of the U.S. Pat. No. 4,539,368 which details this polymerization method.

Generally, the polymer emulsions contain between 5 and 75% by weight of conditioning polymer, preferably more between 20 and 55% by weight.

The aqueous suspensions of polymer particles are obtained by adding polymer in powder form (powder or balls for instance) in saline or non-saline water or in an oil, or in a solvent or a mixture of the latter, in which all or part of the polymers are in solid particulate form. The polymer concentration is usually comprised between 5 and 75% by weight. Generally, the polymer is in powder form and is added to the water or to a mixture of water and solvent, such as alcohol for instance. The powder can only be added to a solvent, like an alcohol. There is an alternative consisting of adding the powder form of the polymer to an oil. Guar gums may be added easily to an oil for instance.

The polymer concentrated liquid according to the invention can contain several soil conditioning polymers and also, other ingredients like, for instance, phytosanitary products, herbicides, pesticides, fungicides, nutrient elements, fertilizers.

In a preferred embodiment of the invention, the polymer concentrated liquid used in the method according to the invention is an aqueous dispersion.

The implementation of the method according to the invention allows many of the described polymers to be applied for soil conditioning such as:
Synthetic polymers: for instance polymers and copolymers based on acrylamide, acrylic acid, acrylates, methacrylic acid, methacrylate, acrylonitrile, vinylpyrrolidone, vinylformamide, itaconic acid, vinyl acetate, maleic acid, glycol ethylene and the derivatives of these polymers, for instance hydrolyzed polyacrylonitrile, alcohol polyvinyl etc.
natural polymers, natural rubbers, polysaccharides and their derivatives: galactomannan, guar gum, carob gum, xanthane gum, arabic gum, chitosan, carrageenan, pectines, starch, modified starch, alginates, celluloses, cellulose derivatives (cellulose ethers), agar-agar, etc.
grafted polymers: for instance, acrylamide starch and acrylamide copolymers, starch and acrylonitrile oil copolymers, chitosan and acrylic acid copolymers etc.

There is a specific advantage in using the method of the invention for polymers based on acrylamide and especially those with high molecular weight because they are more efficient as a soil conditioner than are polymers with a lower molecular density.

In a preferred embodiment of the invention, the polymers used are polymers based on acrylamide having an average molecular density by weight in excess of 250,000 g/mol and preferably comprised between 1 million g/mol and 30 million, and even more preferably in excess of 5 million.

Polymers based on acrylamide are obtained by the polymerization of hydro-soluble monomers having a double ethylene bond, chosen from the following families:
anionic monomers. Advantageously they are chosen from the group comprising monomers having a carboxylic function (e.g.: acrylic acid, methacrylic acid and their salts, etc.), the monomers containing a sulfonic acid function (e.g. 2-acrylamido-2-methylpropane sulfonic acid (AMPS) and their salts, etc.).
non-ionic monomers. Advantageously, they are chosen from the group comprising acrylamide and methacrylamide, acrylamide derivatives such as N-alkylacrylamide for instance N-isopropylacrylamide, N-tert-butylacrylamide, and N,N-dialkylacrylamides like NN-dimethylacrylamide and N-methylolacrylamide. It is also possible to use vinylformamide, N-vinylpyridine, N-vinylpyrrolidone, hydroxyalkyl acrylates and methacrylates, (meth) acrylates containing alkoxy type chains. The preferred non-ionic monomers are acrylamide, NN-dimethylacrylamide, N-vinylpyrrolidone.

cationic monomers. Preferably, they are chosen from the group containing diallyldialkyl ammonium salts like diallyl dimethyl ammonium chloride (DADMAC) and also dialkylaminoalkyl acrylates and methacrylates, especially dialkylaminoethyl acrylate (ADAME) and dialkylaminoethyl methacrylate (MADAME), as well as their acidified or quaternized forms using means well known to the man of the art, and also dialkyl-aminoalkylacrylamides or -methacrylamides, and their acidified or quaternized forms in a known manner, for instance (meth)acrylamido-propyl trimethyl ammonium chloride.

monomers of the zwitterionic types can also be used; they combine both anionic and cationic charge in one and the same monomer. Examples of zwitterionic monomers might include: sulfobetaine monomers like sulfopropyl dimethylammonium ethyl methacrylate, sulfopropyl dimethylammonium propylmethacrylamide, sulfopropyl 2-vinylpyridinium, phosphobetain monomers such as phosphato ethyl trimethylammonium ethyl methacrylate, carboxybetaine monomers.

Without moving out of the scope of the invention, combined with these monomers, other monomers can also be used, in particular hydrophobic or hydrophilic monomers of a hydrophobic nature. As an example, we might mention styrene, alkyl (meth)acrylates, aryl (meth)acrylates, hydrophobic derivatives of acrylamide.

The polymers used as part of the invention can be linear, structured or reticulated. Structured polymers refer to branched polymers in the form of a star or on a comb. These branched polymers, in a conventional manner, are non-linear polymers with lateral chains. Conventionally, a reticulated polymer refers to a nonlinear polymer in the form of a three-dimensional network which is insoluble in water but which swells in water.

Preferably, the polymers are linear or branched. Preferably the polymers are hydro-soluble.

Thanks to the method according to the invention, it is possible to apply in a simple and economic manner to the soil to be conditioned high concentration polymers, without requiring to an irrigation system.

The dispersion forms, emulsions and suspensions of polymers used in this method offer a wide range of concentrations comprised between 5 and 75% by weight which, associated with the specific application equipment, allow relatively small quantities of conditioning polymer to be applied uniformly over large areas without any need for the supply of large amounts of water. These soil conditioning operations can be performed independently of the irrigation phases.

The method according to the invention therefore saves a large amount of water while avoiding the implementation of an irrigation system.

It is also a way of conditioning non-farming land requiring conditioning and for which irrigation cannot be considered.

Finally, the method according to the invention provides better, more consistent and efficient coverage of the soil area because it uses water as a vector. The polymer is therefore much more easily and quickly available to act as a conditioner, unlike the case of the application of polymers in powder, combined or not combined with a filler.

The invention and the resulting advantages are described clearly in the following examples, illustrated by the attached figures.

DETAILED DESCRIPTION OF THE INVENTION

Example 1

Equipment for Implementation of Method

Figure 1:
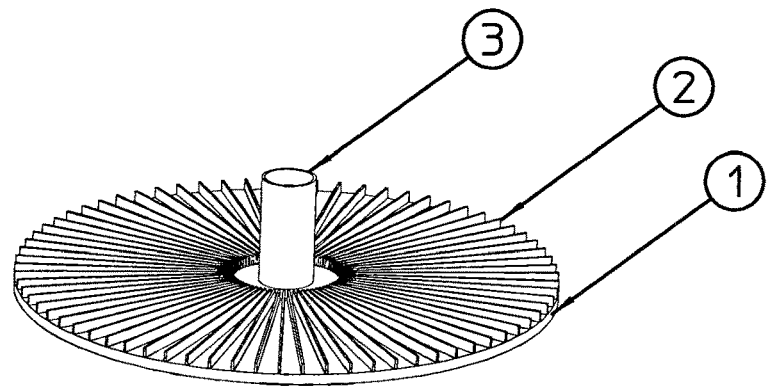
FIG. 1 is a schematic representation of a support according to the invention.
Figure 2:
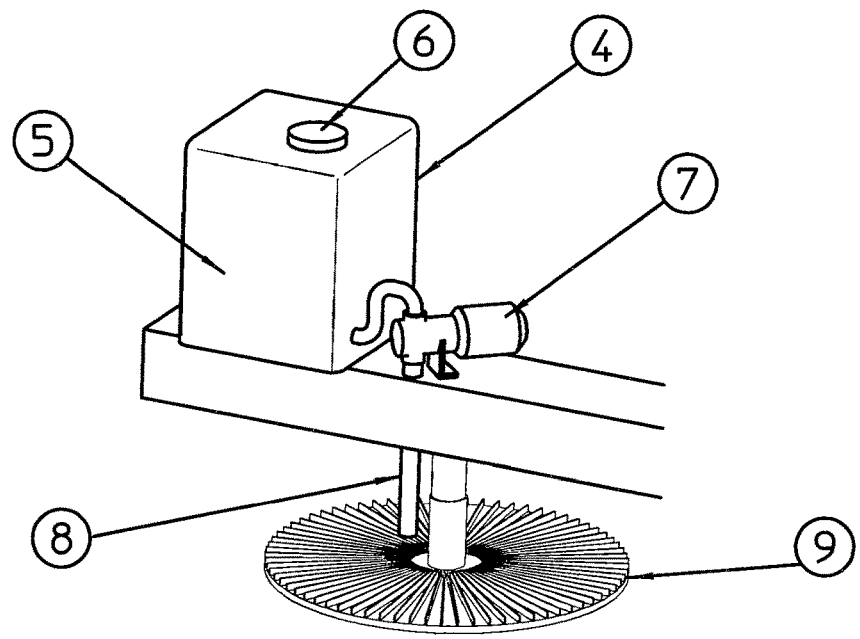
FIG. 2 is a schematic representation of application equipment including the support illustrated in FIG. 1.
Figure 3:
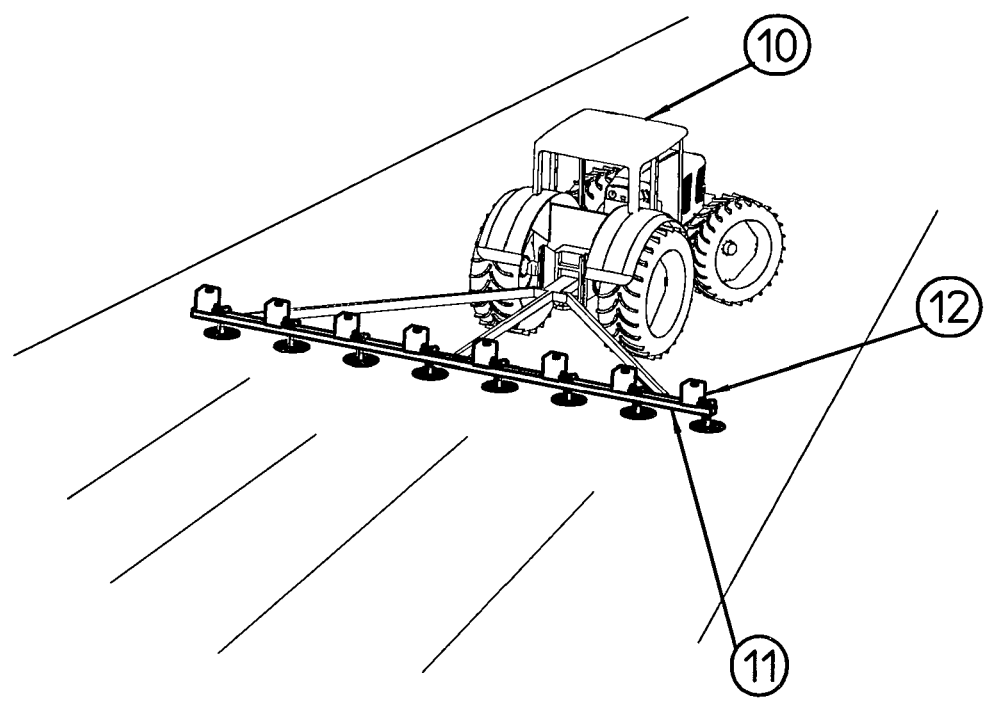
FIG. 3 is a schematic representation of a tractor equipped with the application equipment.

FIG. 1 is a representation of the support which is liable to be implemented within the method of the invention. The support is in the form of a rotating disk (1) with striations extending from the center to the outside (2) and a spindle (3). On contact with the rotating disk, the liquid is transformed into droplets of a variable size depending on the speed of rotation and the rheology of the concentrated polymer liquid.

In FIG. 2, the remainder of the equipment required for the implementation of the method is depicted. The equipment includes a recipient (4) filled with a dispersion of polyacrylamide (5) and provided with an air venting device (6). It also includes a peristaltic pump (7) and a pipe (8) connecting the tank to the support (9).

In FIG. 3, a tractor (10) is shown, carrying a ramp (11) fitted with 8 application equipment units (12) capable of conditioning large surface areas in a reasonable time.

Example 2

Example of Implementation of Method

We attempted to spread 10 kg of polyacrylamide with a conventional agricultural sprayer over an area of almost 1 hectare. We then applied the same quantities of polymer using the method of the invention. The area to be treated was marked out on a larger plot of land in a 72 m wide and 139 m long rectangle, adapted to the size of the spraying machines, i.e. 24 m wide for the conventional sprayer and 12 m wide for the equipment assembled according to the method of the invention.

In the first case, in an agricultural sprayer tank, we diluted an acrylamide copolymer (70% molar density) and sodium acrylate (30% molar density) powder, marketed by SNF SAS under the name of Flobond A30, to the extent of 300 ppm, i.e. a total quantity of mixture to be pulverized amounting to 33,333 liters. With the sprayer having a carrying capacity of 3000 liters, we decided to carry out 12 applications of 2778 liters of the 300 ppm acrylamide copolymer preparation. Each pass required the preparation of the mixture to be sprayed meaning that each time we were required to pour the acrylamide copolymer powder to be diluted slowly into the water of the sprayer tank while constantly stirring it, then to wait a maturation time of approximately 1 hour, while constantly stirring the mixture. Only then could the mixture be sprayed. Because the maximum flow rate of the sprayer is limited, we decided to carry out 3 successive passes at a speed of 5 km/h to spray all the mixture using the jet nozzles habitually used for the application of liquid fertilizers. The spraying of each 2778 liter mixture required approximately 20 minutes allowing for maneuvering. However, the filters of the sprayer had to be cleaned several times because they were easily fouled in the presence of at the dissolved acrylamide copolymer granules or insoluble particles. The time to prepare each mixture added to the time required for each of the 12 planned applications led us to realize that we would be unable to perform the complete operation in one day's work for a surface area of only 1 hectare, forcing us to abandon the operation under way. In addition, for the needs of this experiment, we were obliged to choose a plot of land having a water point to allow us to make up the mixtures. It appears even less possible to implement this method on a plot of land distant from a water point, or in areas where there is a shortage of water. In addition, applying 33,333 liters of water to 1 hectare of soil is a considerable undertaking that we would compare to irrigation. Furthermore, cleaning the spray and its tank called for large amounts of water because of the colloidal nature of the acrylamide copolymer. Accordingly, this method cannot be implemented reasonably.

According to the method of the invention, we assembled a 12 m wide rig with the 12 rotary supports as described previously, each supplied with product by a flexible pipe connected to a single flexible pouch filled with the product to be spread, itself fitted with a coarse filter, placed in a rigid tank with each flexible pipe plugged into its own peristaltic pump mounted on the pipe alongside each rotary atomizer. By advancing at a speed of 7.5 km/hour, 40 liters of aqueous acrylamide copolymer dispersion (70% molar) and of sodium acrylate (30% molar) sold by SNF SAS under the name of SFA 30 (containing 25% copolymer) were applied in 10 minutes. When the operation was complete, the flexible pouch and the flexible pipes were discarded and the rotary supports disassembled then washed in running water.

The invention claimed is:

1. A method of soil conditioning comprising applying a water-soluble or water-swelling polymer to the soil, characterized in that:
   the polymer is prepared as a polymer-concentrated liquid,
   the preparation obtained in this way is applied to the surface of a support rotating about its axis of revolution in order to form droplets which are spread on the soil,
   wherein the polymer-concentrated liquid is stored in a tank and then transported from the tank to the support by a feeding system, the feeding system being a flexible pipe and including a dosing pump; and
   further characterized in that the support is a disc or a cone.

2. The method according to claim 1, characterized in that the polymer-concentrated liquid includes at least one of water, oil and a solvent and a polymer whose concentration represents between 5 and 75% of the preparation weight.

3. The method according to claim 1, characterized in that the polymer concentrate is an aqueous dispersion, an emulsion, an inverse emulsion or a suspension.

4. The method according to claim 1 characterized in that between 0.1 and 500 kg of polymer per hectare is applied to the soil.

5. The method according to claim 1 characterized in that less than 5000 liters of water per hectare is applied to the soil.

6. The method according to claim 1, characterized in that the support is a disc or a cone provided with a raised edge.

7. The method according to claim 1 characterized in that the feeding system is a tank and the polymer concentrated liquid is contained in a tank under pressure.

8. The method according to claim 1 characterized in that the support, the tank and the feeding system are mounted on a pipe carried or towed by a motor-driven machine.

9. The method according to claim 1 characterized in that the water-soluble or water-swellable polymer is chosen from the group consisting of:
   Polymers and copolymers based on acrylamide, acrylic acid, acrylates, methacrylic acid, methacrylates, acrylonitrile, vinylpyrrolidone, vinylformamide, itaconic acid, vinyl acetate, maleic acid, glycol ethylene and the derivatives of these polymers.
   natural polymers, natural rubbers, polysaccharides and their derivatives:
      galactomannan, guar gum, carob gum, xanthane gum, arabic gum, chitosan, carrageen, pectines, starch, modified starch, alginates, celluloses, cellulose derivatives (cellulose ethers), agar-agar; and
   acrylamide starch and acrylamide copolymers, starch and acrylonitrile copolymers, chitosan and acrylic acid copolymers.

10. The method according to claim 1 characterized in that the polymer concentrated liquid is in the form of a dispersion of polymer containing between 5 and 50% by weight of water-soluble or water-swelling polymer.

11. The method according to claim 1 characterized in that the polymer concentrated liquid is in the form of a polymer emulsion containing between 20 and 55% by weight of water-soluble or water-swelling polymer.

12. The method according to claim 1 characterized in that the water-soluble polymer is a polymer based on acrylamide having an average molecular weight by weight in excess of 250,000 g/mol.

13. A method of soil conditioning comprising applying a water-soluble or water-swelling polymer to the soil, characterized in that:
   the polymer is prepared as a polymer-concentrated liquid,
   the preparation obtained in this way is applied to the surface of a support rotating about its axis of revolution in order to form droplets which are spread on the soil,
   wherein the polymer-concentrated liquid is stored in a tank and then transported from the tank to the support by a feeding system, the feeding system being a flexible pipe and including a dosing pump; and
   further characterized in that the support has striations or grooves on its surface, connecting the center of the support to its perimeter.

14. A method of soil conditioning comprising applying a water-soluble or water-swelling polymer to the soil, characterized in that:
   the polymer is prepared as a polymer-concentrated liquid,
   the preparation obtained in this way is applied to the surface of a support rotating about its axis of revolution in order to form droplets which are spread on the soil,
   wherein the polymer-concentrated liquid is stored in a tank and then transported from the tank to the support by a feeding system, the feeding system being a flexible pipe and including a dosing pump; and
   further characterized in that a polymer concentrated liquid is applied to the central part of the support near its axis of rotation.

* * * * *